US008577884B2

(12) United States Patent
Poteet et al.

(10) Patent No.: US 8,577,884 B2
(45) Date of Patent: Nov. 5, 2013

(54) AUTOMATED ANALYSIS AND SUMMARIZATION OF COMMENTS IN SURVEY RESPONSE DATA (75) Inventors: Stephen R. Poteet, Bellevue, WA (US); Anne Kao, Bellevue, WA (US); Shan Luh, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 618 days.

(21) Appl. No.: 12/119,697

(22) Filed: May 13, 2008

(65) Prior Publication Data

US 2009/0287642 A1 Nov. 19, 2009

(51) Int. Cl.
G06F 17/30 (2006.01)
(52) U.S. Cl.
USPC .................. 707/737; 707/738; 707/776
(58) Field of Classification Search
CPC .......... G06F 17/30616; G06F 17/3071; G06F 17/30864
USPC .................. 707/999.003, 705, 738, 739, 776
See application file for complete search history.

(56) References Cited

U.S. PATENT DOCUMENTS

| | | | | |
|---|---|---|---|---|
| 5,893,098 A * | 4/1999 | Peters et al. | ............................ | 1/1 |
| 6,611,825 B1 * | 8/2003 | Billheimer et al. | .............. | 706/45 |
| 6,701,305 B1 | 3/2004 | Holt et al. | | |
| 6,738,786 B2 * | 5/2004 | Sugaya et al. | ......................... | 1/1 |
| 6,757,676 B1 * | 6/2004 | Sugaya et al. | ......................... | 1/1 |
| 6,876,990 B2 * | 4/2005 | Yamanishi et al. | .............. | 706/45 |
| 6,912,521 B2 * | 6/2005 | Kraft et al. | ............................ | 1/1 |
| 7,130,848 B2 * | 10/2006 | Oosta | ...................................... | 1/1 |
| 7,383,251 B2 * | 6/2008 | Might | ................................... | 1/1 |
| 7,548,930 B2 * | 6/2009 | Kobza et al. | ........................... | 1/1 |
| 7,552,063 B1 * | 6/2009 | McEachern | ........................ | 705/3 |
| 7,562,066 B2 * | 7/2009 | Kawatani | ................................ | 1/1 |
| 7,571,110 B2 * | 8/2009 | Tarr et al. | ..................... | 705/7.32 |
| 7,711,737 B2 * | 5/2010 | Surendran | ...................... | 707/748 |
| 7,725,345 B2 * | 5/2010 | Furin et al. | ................... | 705/7.32 |
| 7,765,113 B2 * | 7/2010 | Ware et al. | ......................... | 705/3 |
| 7,937,286 B2 * | 5/2011 | Newman et al. | ............. | 705/7.31 |
| 8,041,695 B2 * | 10/2011 | Wang | ............................ | 707/705 |
| 8,245,135 B2 * | 8/2012 | Cai et al. | ......................... | 715/254 |

(Continued)

FOREIGN PATENT DOCUMENTS

| | | | | |
|---|---|---|---|---|
| JP | 2001-266060 | * | 9/2001 | .............. G06F 17/30 |
| JP | 2006-302107 | * | 11/2006 | .............. G06F 17/30 |

OTHER PUBLICATIONS

"Pareto Chart" archived on Nov. 9, 2007 at: http://web.archive.org/web/20071109230728/www.isixsigma.com/library/content/c010527a.asp?action=print.*

(Continued)

Primary Examiner — Phuong Thao Cao
(74) Attorney, Agent, or Firm — Hope Baldauff, LLC (57) ABSTRACT Technologies are described herein for providing automated analysis and summarization of free-form comments in survey response data. A number of topic words are identified from the survey response comments, and a numeric weight is calculated for each topic word that reflects the relevance of the topic word to each comment. Each topic word is associated with one or more topics and the comments relevant to each topic is then determined based on the weights of the associated topic words in each comment. A report is generated which summarizes the topics and their relative importance in the survey response comments based upon the number of comments relevant to each.

18 Claims, 3 Drawing Sheets

(56) References Cited

U.S. PATENT DOCUMENTS

| | | | |
|---|---|---|---|
| 8,290,810 B2* | 10/2012 | Ramer et al. | 705/7.32 |
| 2002/0019747 A1* | 2/2002 | Ware et al. | 705/2 |
| 2002/0052730 A1* | 5/2002 | Nakao | 704/10 |
| 2002/0052774 A1* | 5/2002 | Parker et al. | 705/10 |
| 2002/0062302 A1* | 5/2002 | Oosta | 707/1 |
| 2002/0116398 A1* | 8/2002 | Sugaya et al. | 707/200 |
| 2002/0188777 A1* | 12/2002 | Kraft et al. | 710/100 |
| 2004/0044950 A1* | 3/2004 | Mills et al. | 715/500 |
| 2004/0172323 A1* | 9/2004 | Stamm | 705/10 |
| 2004/0215502 A1* | 10/2004 | Takahashi et al. | 705/10 |
| 2005/0033633 A1* | 2/2005 | LaPasta et al. | 705/11 |
| 2005/0096943 A1* | 5/2005 | Siegalovsky et al. | 705/2 |
| 2005/0108200 A1* | 5/2005 | Meik et al. | 707/3 |
| 2005/0114321 A1* | 5/2005 | DeStefano et al. | 707/3 |
| 2005/0250081 A1* | 11/2005 | Salladay | 434/236 |
| 2006/0089947 A1* | 4/2006 | Gallivan et al. | 707/102 |
| 2006/0155513 A1* | 7/2006 | Mizrahi et al. | 702/179 |
| 2006/0155662 A1* | 7/2006 | Murakami et al. | 706/20 |
| 2006/0155751 A1* | 7/2006 | Geshwind et al. | 707/102 |
| 2006/0178918 A1* | 8/2006 | Mikurak | 705/7 |
| 2007/0038646 A1* | 2/2007 | Thota | 707/100 |
| 2007/0078831 A1* | 4/2007 | Relvas | 707/3 |
| 2007/0083509 A1* | 4/2007 | Wu et al. | 707/6 |
| 2007/0094039 A1* | 4/2007 | Grant et al. | 705/1 |
| 2007/0118518 A1* | 5/2007 | Wu et al. | 707/5 |
| 2007/0136288 A1* | 6/2007 | Shimada et al. | 707/7 |
| 2007/0192168 A1* | 8/2007 | Van Luchene | 705/10 |
| 2007/0294149 A1* | 12/2007 | Lu et al. | 705/28 |
| 2008/0109399 A1* | 5/2008 | Liao et al. | 707/2 |
| 2008/0109454 A1* | 5/2008 | Willse et al. | 707/100 |
| 2008/0112557 A1* | 5/2008 | Ricketts | 379/265.03 |
| 2008/0114748 A1* | 5/2008 | Varner | 707/5 |
| 2008/0214162 A1* | 9/2008 | Ramer et al. | 455/414.2 |
| 2008/0243641 A1* | 10/2008 | Leno | 705/27 |
| 2009/0006377 A1* | 1/2009 | Kobayashi et al. | 707/5 |
| 2009/0119343 A1* | 5/2009 | Jiao et al. | 707/200 |
| 2009/0171951 A1* | 7/2009 | Lucas et al. | 707/5 |
| 2009/0222551 A1* | 9/2009 | Neely et al. | 709/224 |
| 2009/0306967 A1* | 12/2009 | Nicolov et al. | 704/9 |
| 2010/0114561 A1* | 5/2010 | Yasin | 704/9 |
| 2011/0191372 A1* | 8/2011 | Kaushansky et al. | 707/776 |

OTHER PUBLICATIONS

SurveyGizmo website, "Bill Johnston: Analyzing and Summarizing Survey Comments with Excel", Article, 7 pages, posted on Jan. 6, 2009, accessed online at <http://www.surveygizmo.com/survey-blog/bill-johnston-analyzing-and-summarizing-survey-comments-with-excel/> on Aug. 15, 2013.*

SurveyMonkey website, "What is text Analysis", Copyright 1999-2013, 3 pages, accessed online at <http://help.surveymonkey.com/articles/en_US/kb/What-is-Text-Analysis> on Aug. 15, 2013.*

King et al., "2003 Employee Attitude Survey: Analysis of Employee Comments", Report of Federal Aviation Administration, Jun. 2005, 46 pages, accessed online at <http://www.faa.gov/data_research/research/med_humanfacs/oamtechreports/2000s/media/0513.pdf> on Aug. 15, 2013.*

* cited by examiner

AUTOMATED ANALYSIS AND SUMMARIZATION OF COMMENTS IN SURVEY RESPONSE DATA

TECHNICAL FIELD

The present disclosure relates generally to data mining of text data, and more particularly to the analysis and summarization of free-form comments in survey responses.

BACKGROUND

The analysis of survey results requires the relevant data from the survey responses be extracted and summarized in such a way that makes apparent to the analyst what issues or topics are important to the respondents, as well as the relative importance of the various topics with each other. This analysis may be done programmatically or manually by survey analysts, depending on the type of data collected and the number of responses received. A typical survey may collect both structured and free-form data in the responses. For example, an online employee satisfaction survey targeted at employees of a company may survey the employees' satisfaction with their job and work environment by having them select a numeric rating from 1 to 5 for a number of employment satisfaction factors, such as salary, benefits, training, etc. The survey may also provide a comment area where each employee can respond with any other issues or factors that affect the employee's satisfaction, both positive and negative, or provide overall comments regarding their job or work environment.

In this example survey, the structured response data consisting of the selected numeric ratings of the various factors is easily extracted from the responses and summarized, using a variety of traditional data mining technologies. The free-form text comments, however, are much more difficult to analyze and summarize because of the exceedingly broad scope of responses possible. The employee may provide either negative responses, positive responses, or both, and their comments may relate to a wide variety of internal and external employment issues, many of which may not have been conceived by the designer of the survey. In addition, different employees may use different vocabulary to describe the same issues. These factors make it difficult to quantify the responses in a way that is meaningful.

Because of the complexity involved in analyzing and summarizing free-form comments in survey response data, it is often required that the comments be reviewed manually by trained analysts. This can be a costly and time-consuming process, and an analyst's judgment on the importance of individual comments can be influenced by qualitative factors, such as how well or how poorly a comment is written. Often only a small sample of the comments are actually reviewed, which may lead to important topics related in the responses being missed or incomplete or inaccurate analysis because the sample size is not sufficient to support the results.

Few programmatic methods exist for automating the task of analyzing such free or semi-structured response data. Moreover, these methods often require the creation of a lexicon or knowledgebase corresponding to the context of the question that prompted the response before the analysis of the response data can be performed. For example, in a survey regarding consumers' satisfaction with the purchase of a camera, a lexicon for analyzing the survey response data can be created which identifies the features of the camera, such as "price," "lens," "battery life," "picture quality," "speed," and "ease of use," as well as words and other grammatical constructs which are used to represent a purchasers' satisfaction with a particular feature, such as "better," "like," "hate," "poor," etc. This lexicon can then be used to analyze the camera satisfaction survey responses and generally summarize the features that are liked and disliked by purchasers of the camera.

However, these methods are inadequate in analyzing and summarizing a completely free-form comment response, such as the employment satisfaction comments in the example above. In this case, developing a context may be practically impossible since the scope of possible responses is not nearly as finite as comments regarding the features of a camera.

It is with respect to these considerations and others that the disclosure made herein is presented.

SUMMARY

Technologies are described herein for providing automated analysis and summarization of free-form comments in survey response data. Through the concepts and technologies presented herein, free-form comments can be analyzed and summarized programmatically, without the need to pre-develop a context or lexicon to describe the scope of responses. The text of the comments in the survey response data is utilized to develop the semantic relationships between words and terms contained therein, and to extract the salient topics represented by the comments. The topics, along with the number of comments relevant to each, are summarized in reports and charts that provide the survey results.

According to one aspect presented herein, a number of topic words are identified from the survey response comments, and a numeric weight is calculated for each topic word that reflects the relevance of the topic word to each comment. A set of topics is identified from the topic words, and each topic word is associated with one or more of the topics. The number of comments relevant to each topic is then computed by counting the comments where the weights of each of the associated topic words for the comment exceed a threshold value. Finally, a report is generated which summarizes the topics and their relative importance in the survey response comments based upon the number of comments relevant to each.

In a further aspect, the identification of the topic words and the calculation of the weights of each topic word for each comment is performed by extracting a number of words or terms from the comments and constructing a term-document matrix, where the entries represent the frequency of occurrence of each term in each of the comments. The term-document matrix is transformed utilizing a matrix decomposition that reduces the rank of the matrix. In one aspect, the transformation may be accomplished using a truncated two-sided orthogonal decomposition. The transformation produces a reduced rank matrix containing a number of topic words along with a weight for each comment reflecting the importance of the topic word in the comment in light of the other terms in the comment.

According to another aspect presented herein, demographic data may be collected from respondents along with the survey response comments. The demographic data is extracted from the survey response data in conjunction with the comments. A number of topic words are identified from the comments, and a numeric weight is calculated for each topic word that reflects the relevance of the topic word to each comment. One or more demographic groupings are specified, and the number of comments relevant to each topic word within each demographic group is computed by counting the comments where the weight of the topic word for the comment exceeds a threshold value. Finally, a report is generated which summarizes the topic words and their relative importance within each demographic group based upon the number of response comments from that demographic group which is relevant to each topic word.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

The features, functions, and advantages that have been discussed can be achieved independently in various embodiments of the present invention or may be combined in yet other embodiments, further details of which can be seen with reference to the following description and drawings.

DETAILED DESCRIPTION

The following detailed description is directed to technologies for providing automated analysis and summarization of free-form comments in survey response data. Through the embodiments presented herein, free-form comments can be analyzed and summarized programmatically, without the need to pre-develop a context or lexicon to describe the scope of responses. According to various embodiments, the text of the comments in the survey response data is utilized to develop the semantic relationships between words and terms contained therein, and to extract the salient topics represented by the comments. Each comment is weighted to reflect its relevance as to each topic extracted. The topics and the relative weights of each comment in the survey response data response are then utilized to generate reports and charts that provide an easy to grasp summary of the results.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which show by way of illustration specific embodiments or examples. Referring now to the drawings, in which like numerals represent like elements through the several figures, aspects of a methodology for automating the analysis and summarization of free-form comments in survey response data will be described.

Figure 1:
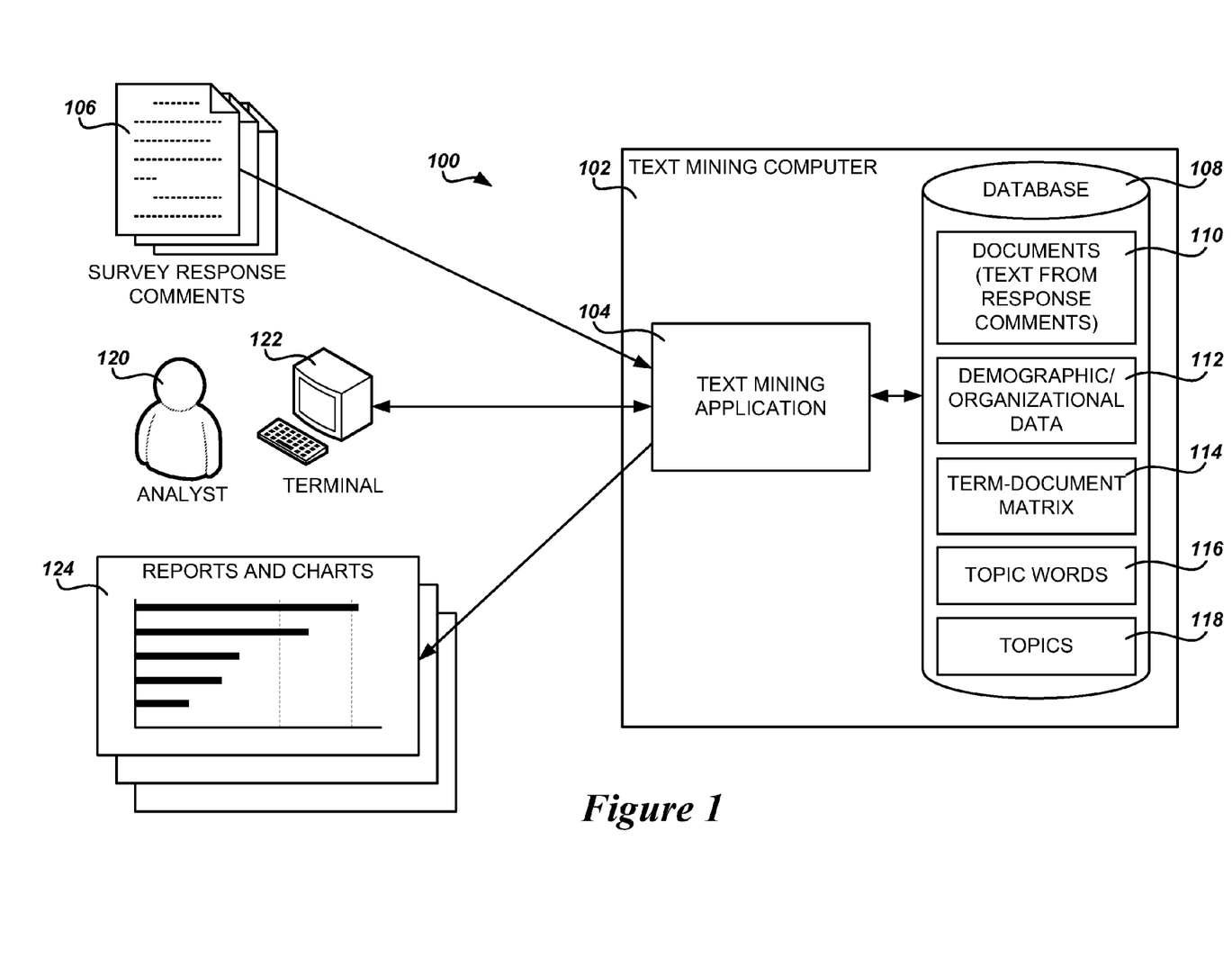
FIG. 1 is a block diagram showing aspects of an illustrative operating environment and software components provided by the embodiments presented herein.

Turning now to FIG. 1, details will be provided regarding an illustrative operating environment and software components provided by the embodiments presented herein. FIG. 1 illustrates an exemplary system 100 including a text mining computer 102 that executes a text mining application 104. As used herein, the term exemplary indicates an example and not necessarily an ideal. The text mining application 104 provides the functionality for collecting, analyzing, and reporting free-form survey response comments 106, according to embodiments presented herein. The survey response comments 106 may exist in a variety of forms, such as electronic data collected from an online surveying website, paper forms requiring scanning and optical character recognition (OCR) processing, or audio files requiring the application speech recognition processing.

As will be discussed in greater detail below in regard to FIG. 2, according to one embodiment, multiple operations in the automated analysis and summarization of the survey response comments 106 may optionally involve manual assessments and analysis by an analyst 120. The text mining application 104 provides the functionality and user interface (UI) for the analyst 120 to perform these functions using a terminal 122 connected to the text mining computer 102.

The text mining application 104 is further connected to a database 108, which contains documents 110 consisting of the text extracted from each survey response comment 106. In one embodiment, the database 108 also contains demographic and/or organizational data 112 collected from respondents along with corresponding survey response comments 106. The demographic and/or organizational data 112 may be utilized for reporting the results of the analysis of the survey response comments 106, as will be described in detail below in regard to FIG. 2.

Figure 2:
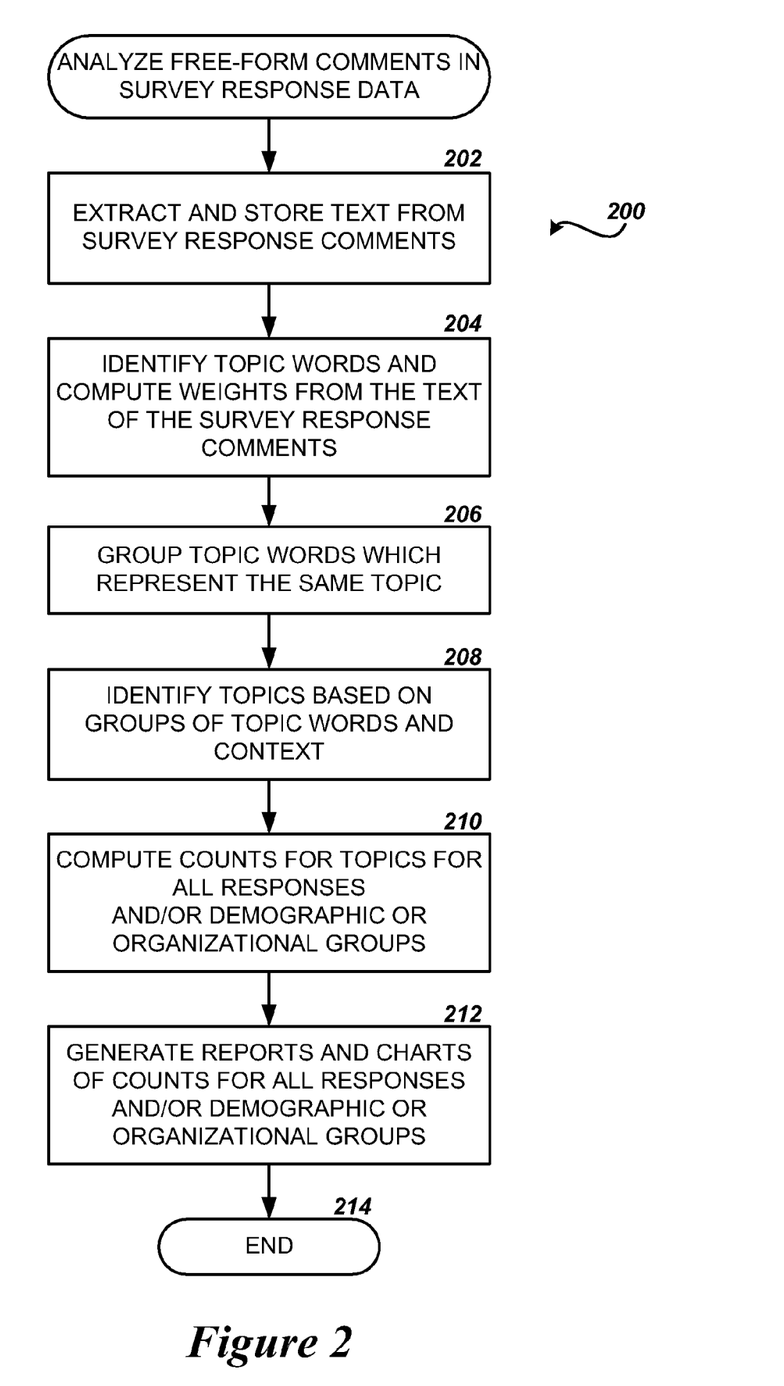
FIG. 2 is a flow diagram showing one method for automating the analysis and summarization of free-form comments in survey response data, as provided in the embodiments described herein.

In addition, the database 108 is utilized by the text mining application 104 to store a list of topic words 116 and topics 118 identified by the text mining application 104 during the automated analysis as detailed in the process illustrated in FIG. 2. The database 108 may also contain a term-document matrix 114 constructed by the text mining application 104 during the analysis process. While FIG. 1 illustrates the documents 110, demographic data 112, list of topic words 116, topics 118, and term-document matrix 114 as being contained in the database 108, it will be appreciated that this data may be contained in any non-volatile or volatile storage systems operatively connected to the text mining computer 102. The database 108 may also be hosted on a remote computer platform operatively connected to the text mining computer 102.

Once the analysis is complete, the text mining application 104 generates reports and charts 124 containing the details of the analysis of the survey response comments 106. The reports and charts 124 are generated from the documents 110, the term-document matrix 114, the list of topic words 116, the topics 118, and, optionally, the demographic and organizational data 112 in the database 108.

While the text mining application 104 is illustrated in FIG. 1 as existing on a single text mining computer 102, it will be appreciated that the text mining application 104 may consist of a number of application programs or modules, such as data mining modules, text analysis modules, and reporting and charting modules, spread among multiple, operatively connected computers. Further, the terminal 122 may consist of a monitor and keyboard connected directly to the text mining computer 102 or a remote workstation computer connected to the text mining computer 102 over a network, such as a LAN, WAN, or the Internet. The functionality and UI provided by the text mining application 104 to the analyst 120 through the terminal 122 may be provided as a local application supporting an analyst at a directly connected monitor and keyboard, or as a networked application supporting analysts 120 at remote workstations.

Referring now to FIG. 2, additional details will be provided regarding the embodiments presented herein for automating the analysis and summarization of free-form comments in survey response data. In particular, FIG. 2 is a flow diagram illustrating a process for collecting, analyzing, summarizing, and reporting on the survey response comments 106, according to one embodiment. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where the text mining application 104 extracts the text from the free or semi-structured survey response comments 106 and stores the text as a document 110 in the database 108. As discussed above, in one embodiment, the survey response comments 106 may be in electronic form, collected by a web-based survey application, for example. In further embodiments, the survey response comments may be hand-written or in the form of recorded audio and require optical character recognition (OCR) or speech-recognition processing in order to extract the text and store in the database 108. It will be appreciated that the survey response comments 106 may be in any number of forms other than those described above, and that the text mining application 104 may utilize any known method for extracting text from the survey response comments 106.

According to one embodiment, the survey response comments may be accompanied by structured data 112 indicating the demographics or organizational unit of the respondent. For example, a set of survey response comments 106 may be collected in connection with an employee satisfaction survey as described above. Each survey may consist of a series of entries identifying the employee's (respondent's) location, the business unit to which she belongs, and her pay-code, along with the numeric ratings for the various employee satisfaction factors and the free-form comment area. The text mining application 104 extracts the text from the comments area of the survey for each response and stores it as a document 110 in the database 108. In addition, the structured data 112 regarding the respondent's location, business unit, and pay-code is also stored in the database 108 along with the document 110 representing the respondent's comments 106 for further reporting, as will be will be described in more detail below in regard to operations 212.

In a further embodiment, the survey response comments 106 may consist of free, unstructured answers to a set of specific questions in a survey. The text of the answers to each question for a respondent is extracted separately and stored as an individual document 110 in the database 108, and documents 110 representing the respondents' answers to the same question are analyzed together in order to provide context for the analysis in the operations described below.

From operation 202, the routine 200 proceeds to operation 204, where the text mining application 104 identifies a list of topic words 116 from the documents 110 and computes a weight for each topic word for each document 110. The list of topic words 116 is then stored in the database 108. According to various embodiments, the text mining application 104 identifies the topic words 116 by mining a list of terms from the documents 110, ignoring commonly used words, or "stop words." Stop words include terms that do not contribute to the overall meaning of the comment but instead simply add grammatical structure, such as conjunctions, articles, pronouns, prepositions, etc. This list of terms may be further reduced by eliminating low frequency words or words that are common and therefore poor topic discriminators. For example, survey comments frequently start with expressions like "what I like about . . . ." In addition, the list of terms may be refined by applying acronym and abbreviation expansion, word stemming, spelling normalization, synonym substitution, multi-word term extraction, and other techniques known in the art.

Next, the text mining application 104 computes the occurrence of each term in each document 110 and stores the result in a term-document matrix 114, with the rows representing each term, and the columns representing each document 110, for example. The term-document matrix 114 is then further processed to take into account semantic patterns in the comments 106 and remove the differences that accrue from respondents' variability in word choice to describe similar ideas by transforming the term-document matrix 114 utilizing a matrix decomposition to reduce the rank of the matrix. In one embodiment, this is accomplished by projecting the document vectors, represented by the columns of the term-document matrix 114, into a lower dimensional subspace via a two-sided orthogonal decomposition, such as a truncated URV (TURV) decomposition, and then projecting the lower dimensional document vectors back into term space, as described in U.S. Pat. No. 6,611,825, which is incorporated by reference herein in its entirety. The effect of the TURV decomposition is a weighting of terms that better reflects the concepts underlying the terms. By using only those terms with weights above a certain threshold value, a reduced list of topic words 116 is produced, along with a calculated weight for each topic word reflecting the relevance of the topic word 110 to each document.

For example, in the employee satisfaction survey described above, a particular set of comments 106 regarding employee's healthcare benefits may contain various terms such as "benefits," "medical," "health," "insurance," "coverage" etc. Utilizing the TURV decomposition of the term-document matrix 114 described above, the text mining application 104 may identify a list of topic words 116 including "healthcare" and "benefits" and weight the topic words "healthcare" and "benefits" heavily for each of these comments. Even if the text extracted from the comments did not specifically contain either of these terms, the text mining application 104 would be able to determine the relevance of the documents 110 to the topic words based upon the semantic relationships computed between the related terms from the analysis of the totality of survey response comments 106 provided. It should be appreciated, however, that any matrix decomposition commonly known in the art other than the TURV decomposition of the term-document matrix 114 described above may be utilized to generate the list of topic words 116 and compute the weight for each document, including, but not limited to, a non-negative matrix factorization, concept decomposition, or semi-discrete decomposition.

The routine 200 then proceeds from operation 204 to operation 206, where the list of topic words 116 is analyzed to identify groups of related topic words that represent the same topic. In one embodiment, this may be accomplished programmatically by the text mining application 104. For example, the text mining application 104 may identify two topic words that occur in similar contexts, such as "manager" and "supervisor," based upon a correlation between the weights computed for the topic words across the documents 110 in the database 108 or any other clustering algorithm. In addition, the text mining application 104 may detect morphologically similar topic words, such as "manager" and "management," or utilize a database indicating synonymy or other word relationships, such as WORDNET from Princeton University, or a specific thesaurus developed within the context of the survey. It will be appreciated that any number of automated methods may be utilized by the text mining application 104 to identify related topic words that correspond to the same topic.

In another embodiment, groups of related topic words may be identified manually by an analyst 120 by analyzing documents 110 containing similar topic words and applying knowledge of the context of the survey question that prompted the response comments 106. Continuing with the employee satisfaction survey example from above, an analyst 120 may utilize the text mining application 104 to review documents 110 containing the topic words "medical" and "health" and may determine that these topic words are used interchangeably to refer to healthcare benefits by respondents in response to the prompt for comments regarding overall employment satisfaction. Once a group of related topic words has been identified, the list of topic words 116 in the database 108 is modified to record the relationships so that the groups of related topic words are combined in subsequent analysis, as will be described in detail below in regard to operation 210.

From operation 206, the routine 200 proceeds to operation 208, where the list of topic words 116 is further analyzed to identify the discrete topics 118 contained in the survey responses comments 106, which will be utilized for the counts computed below in operation 210. As in operation 206, this may be accomplished programmatically by the text mining application 104 or manually by an analyst 120 utilizing functionality provided by the text mining application 104. In one embodiment, the text mining application 104 may search for identified topic words that occur within a certain proximity to each other within a document 110, and based upon the proximity and grammatical usage of the words, determine that certain combinations of topic words are associated with a particular topic in the responses. For example, the text mining application 104 may identify the topic words "better," "equipment," and "pay" from the documents 110 extracted from a set of employment satisfaction survey response comments 106, and further determine that the topic word "better" regularly precedes, either directly or within a certain number of words, both the topic words "equipment" and "pay" in documents 110 having a high document weight for those topic words. From this determination, the text mining application 104 may deduce that two topics 118 represented in the responses 106 are "better pay" and "better equipment."

In another embodiment, an analyst 120 may utilize the text mining application 104 to review documents 110 containing the topic words "pay," "job," "training," and "same," and, based upon the context of the survey question that prompted the response comments 106, deduce that the topics 118 of "same pay for the same job" and "better job training" are represented in the responses 106. Once the discrete topics 118 are determined, they are stored in the database 108 along with the association of topic words 116 to each topic 118.

Next, the routine 200 proceeds from operation 208 to operation 210, where the text mining application 104 computes counts of the number of documents 110 relevant to each topic based upon the weights computed for each of the associated topic words for each document. In one embodiment, each document 110 is counted as relevant only to a topic where the weights computed for each of the associated topic words exceeds a threshold value. For example, given a threshold value of 0.300, a document 110 having a weight value of 0.572 for the topic word "job" and 0.254 for the topic word "same," associated with the topic of "same pay for same job," and a weight value of 0.327 for the topic word "better" and 0.472 for the topic word "equipment," associated with the topic of "better equipment," will only be counted as relevant to the topic of "better equipment."

According to further embodiments, the counts may be performed across all documents 110 representing all responses 106 for a particular survey as well as across specific demographic or organizational groups, according to the demographic and/or organizational data 112 collected in the database 108 along with the documents 110. For example, in the employee satisfaction survey example above, counts may be computed across all responses as well as across each pay code, each location or region, each business unit, or any combination thereof. In one embodiment, the analyst 120 may specify the demographic or organizational groups desired by utilizing the terminal 122 connected to the text mining computer 102.

From operation 210, the routine 200 proceeds to operation 212, where the text mining application 104 generates reports and charts 124 which provide the results of the analysis and summarization of the survey response comments 106. The reports and charts 124 may detail the number of responses 106 received, the list of topic words 116 identified from the documents 110 corresponding to the responses 106, the topics 118 determined from related or associated topic words, and the number of documents 110 relevant to each topic 118, based on the counts computed in operation 210 above. The reports and charts may provide the overall values as well as these values broken down by the demographic or organizational groups for which counts were generated.

The reports and charts 124 created will be determined by the data available in the database 108, the number of survey responses 106, and the existence of demographic or organizational data 112 returned with the responses 106. For example, the reports and charts 124 for the employee satisfaction survey may include a report that provides the overall numbers, the topic word list, and the discrete topics 118 identified from the topic words, as well as a Pareto charts for each business unit showing the counts of documents relevant to each topic, in order of descending importance. It will be appreciated, however, that a variety of reports, charts, and graphs commonly known in the art may be utilized to provide the results of the analysis and summarization of the survey response comments 106.

In one embodiment, the reports and charts 124 are generated by the text mining application 104 in response to a request by the analyst 120 utilizing the terminal 122 to specify which reports or charts 124 are to be generated along with parameters for their generation. In other embodiments, the analyst 120 may use a generic query tool to retrieve specific data from the database 108 into an external data analysis and reporting tool, such as MICROSOFT EXCEL from MICROSOFT CORP. of Redmond, Wash. The routine 200 then proceeds from operation 212 to operation 214 where the process ends.

Figure 3:
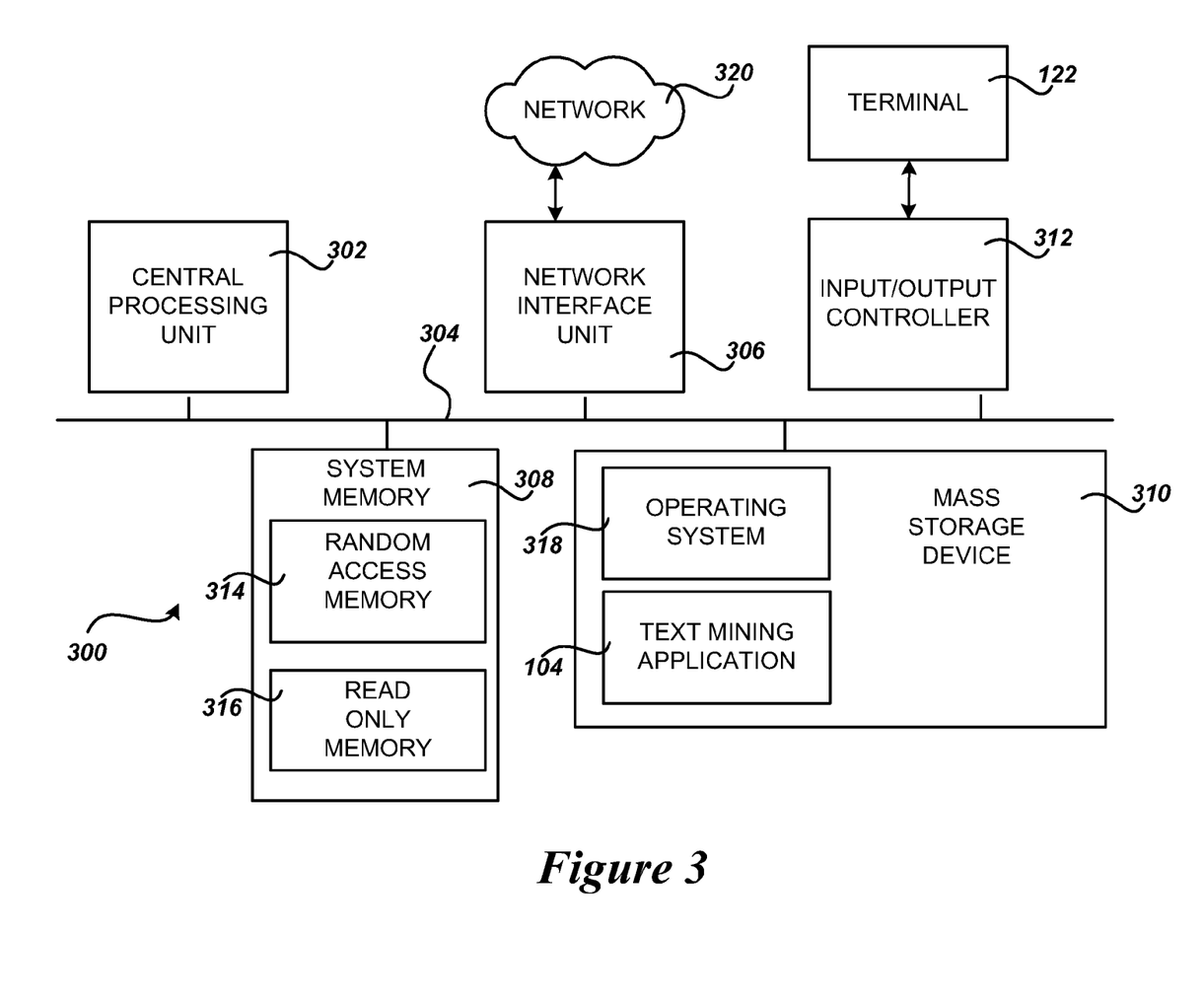
FIG. 3 is a block diagram showing an illustrative computer hardware and software architecture for a computing system capable of implementing aspects of the embodiments presented herein.

FIG. 3 shows an illustrative computer architecture for a computer 300 capable of executing the software components described herein for providing automated analysis and summarization of free-form comments in survey response data in the manner presented above. The computer architecture shown in FIG. 3 illustrates a conventional desktop, laptop, or server computer and may be utilized to execute any aspects of the software components presented herein described as executing on the text mining computer 102.

The computer architecture shown in FIG. 3 includes a central processing unit 302 (CPU), a system memory 308, including a random access memory 314 (RAM) and a read-only memory 316 (ROM), and a system bus 304 that couples the memory to the CPU 302. A basic input/output system containing the basic routines that help to transfer information between elements within the computer 300, such as during startup, is stored in the ROM 316. The computer 300 also includes a mass storage device 310 for storing an operating system 318, application programs, and other program modules, which are described in greater detail herein.

The mass storage device 310 is connected to the CPU 302 through a mass storage controller (not shown) connected to the bus 304. The mass storage device 310 and its associated computer-readable media provide non-volatile storage for the computer 300. Although the description of computer-readable media contained herein refers to a mass storage device, such as a hard disk or CD-ROM drive, it should be appreciated by those skilled in the art that computer-readable media can be any available computer storage media that can be accessed by the computer 300.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 300.

According to various embodiments, the computer 300 may operate in a networked environment using logical connections to remote computers through a network such as the network 320. The computer 300 may connect to the network 320 through a network interface unit 306 connected to the bus 304. It should be appreciated that the network interface unit 306 may also be utilized to connect to other types of networks and remote computer systems. The computer 300 may also include an input/output controller 312 for receiving and processing input from a number of other devices, including a keyboard, mouse, or electronic stylus, such as may be present on the connected terminal 122. Similarly, an input/output controller 312 may provide output to a display screen, a printer, or other type of output device further present on the connected terminal 122.

As mentioned briefly above, a number of program modules and data files may be stored in the mass storage device 310 and RAM 314 of the computer 300, including an operating system 318 suitable for controlling the operation of a networked desktop, laptop, or server computer. The mass storage device 310 and RAM 314 may also store one or more program modules. In particular, the mass storage device 310 and the RAM 314 may store the text mining application 104, which was described in detail above with respect to FIG. 1. The mass storage device 310 and the RAM 314 may also store other types of program modules or data.

Based on the foregoing, it should be appreciated that technologies for automating the analysis and summarization of free-form comments in survey response data are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for summarizing free-form comments in survey response data, the method comprising:

receiving survey responses from a plurality of respondents to a survey, the survey including a series of entries to identify respondent information and a free-form comment area;

extracting, by a computing device, text from the free-form comment area of a survey response of each respondent, and storing the text as a respondent document in a survey database including a plurality of respondent documents representing respondents' answers to the survey;

identifying, by the computing device, a plurality of topic words from the text of the free-form comment area of each survey response in the survey database;

computing, by the computing device, a weight for each of the plurality of topic words, wherein the weight indicates a relevance of the topic word in the free-form comment area of each survey response in the survey database;

assigning, by the computing device, one or more of the plurality of topic words to each respondent document in the survey database;

identifying, by the computing device, one or more discrete topics associated with certain combinations of topic words, each combination of topic words based upon a certain proximity between the topic words within the respondent document, a grammatical user of the topic words, and a high document weight for each of those topic words;

for each of the identified one or more discrete topics, computing, by the computing device, a count of number of respondent documents in the survey database associated with the each of the identified one or more discrete topics and based upon document weights computed for each topic word in an associated combination of topic words that exceed a threshold value; and generating, by the computing device, a report comprising an indication of a relative importance of each of the identified one or more discrete topics based upon the count of the number of respondent documents in the survey database computed for each of the identified one or more discrete topics.

2. A computer-implemented method of claim 1, wherein identifying the plurality of topic words from the text of the free-form comment area of each survey response in the survey database and computing the weight for each of the plurality of topic words further comprising:
   extracting, by the computing device, a plurality of terms from text of the survey of the plurality of respondent documents;
   constructing, by the computing device, a term-document matrix, wherein each entry in the term-document matrix comprises a frequency of occurrence of one of the plurality of terms in a particular respondent document of the plurality of respondent documents;
   transforming, by the computing device, the term-document matrix by applying a matrix decomposition into a transformed matrix, wherein each entry in the transformed matrix comprises a weight for one of the plurality of terms and for each of the plurality of respondent documents; and
   identifying, by the computing device, the plurality of topic words from a subset of the plurality of terms each having a weight exceeding the threshold value.

3. The computer-implemented method of claim 2, wherein transforming the term-document matrix is accomplished using a truncated two-sided orthogonal decomposition.

4. The computer-implemented method of claim 2, wherein extracting the plurality of terms from the text of the plurality of respondent documents comprises:
   extracting, by the computing device, each word from the text of each of the plurality of respondent documents;
   determining, by the computing device, if the extracted word is a stop word; and
   one of
      including, by the computing device, the extracted word in the plurality of terms when the extracted word is not a stop word; or
      excluding, by the computing device, the extracted word from the plurality of terms when the extracted word is a stop word.

5. The computer-implemented method of claim 1, further comprising:
   receiving demographic data as a respondent provides information;
   specifying one or more demographic groups based on the received demographic data;
   for each of the one or more specified demographic groups and each of the one or more discrete topics, computing, by the computing device, a second count of a number of respondent documents in the survey database associated with each of the one or more specified demographic groups and relevant to each of the one or more discrete topics, and based upon computed document weights for each topic word in an associated combination of topic words, wherein the computed document weights exceed the threshold value; and
   generating, by the computing device, a second report for each of the one or more specified demographic groups, the second report comprising a second indication of the relative importance of each of the one or more discrete topics based upon the second count of the number of respondent documents in the survey database computed for each of the one or more discrete topics and each of the one or more specified demographic groups.

6. The computer-implemented method of claim 1, further comprising identifying at least one group of related topic words from the plurality of topic words based on topic words that represent a same topic, and storing a relationship representing the at least one group of related topic words with corresponding weights for each of the plurality of topic words.

7. The computer-implemented method of claim 1, wherein the report comprises a chart illustrating a relationship between the count of the number of respondent documents computed for each of the one or more discrete topics.

8. The computer-implemented method of claim 7, wherein the chart comprises a type of Pareto chart.

9. A non-transitory computer storage medium having computer executable instructions stored thereon that, when executed by a computer, will cause the computer to:
   create a plurality of respondent documents, wherein each respondent document comprises text of a comment from survey responses from a plurality of respondents to a survey, the survey including a series of entries to identify respondent information and a free-form comment area, the plurality of respondent documents representing respondents' answers to a same question;
   store the plurality of respondent documents in a survey database;
   extract a plurality of terms from the plurality of respondent documents;
   construct a term-document matrix, wherein each entry in the term-document matrix comprises a frequency of occurrence of one of the plurality of terms in one of the plurality of respondent documents;
   transform the term-document matrix utilizing a matrix decomposition into a transformed matrix, wherein each entry in the transformed matrix comprises a weight for one of the plurality of terms in one of the plurality of respondent documents;
   identify one or more discrete topics associated with certain combinations of topic words, each combination of topic words based upon a certain proximity between the topic words within a respondent document of the plurality of respondent documents, a grammatical use of the topic words, and a high document weight for each of those topic words;
   for each of the identified one or more discrete topics, compute a count of number of respondent documents in the survey database associated with the each of the identified one or more discrete topics and based upon document weights computed for each topic word in an associated combination of topic words that exceed a threshold value; and
   generate a report comprising an indication of a relative importance of each of the identified one or more discrete topics based upon the count of the number of respondent documents in the survey database computed for each of the identified one or more discrete topics.

10. The non-transitory computer storage medium of claim 9, wherein transforming the term-document matrix is accomplished using a truncated two-sided orthogonal decomposition.

11. The non-transitory computer storage medium of claim 9, having further computer executable instructions stored thereon that, when executed by the computer, will cause the computer to:
   receive demographic data regarding a respondent providing a comment;

associate the demographic data with the respondent document in the database that contains the text of the comment from the survey database;
store the demographic data associated with the respondent document in the survey database;
specify one or more demographic groups;
for each of the one or more specified demographic groups and each of the plurality of terms, compute a second number of respondent documents associated with each of the one or more demographic groups and relevant to each of the plurality of terms, wherein document weight of the term for each of the second number of respondent documents exceeds the threshold value; and
generate a report for each of the one or more specified demographic groups, the report comprising an indication of a relative importance of each of the plurality of terms based upon the second number of respondent documents computed for each of the plurality of terms and each of the one or more specified demographic groups.

12. The non-transitory computer storage medium of claim 11, wherein the report comprise a chart illustrating a relationship between the second number of respondent documents computed for each of the plurality of terms.

13. The non-transitory computer storage medium of claim 12, wherein the chart comprises a type of Pareto chart.

14. A system for performing automated analysis of comments in survey response data, the system comprising:
a processor;
a memory; and
a text mining application residing in the memory and executing on the processor, the text mining application configured to:
extract demographic data regarding each respondent of a plurality of respondents, each respondent providing a comment for each survey response, wherein the survey response data includes comments provided by the plurality of respondents,
identify a plurality of topic words from text of the comments,
compute a weight for each of the plurality of topic words in each of the comments, wherein the weight indicates a relevance of the topic word in the comment,
identify one or more discrete topics associated with certain combinations of topic words, each combination of topic words based upon a proximity between the topic words within a comment, a grammatical use of the topic words, and a high document weight for each of those topic words,
specify one or more demographic groups from the extracted demographic data,
for each of the one or more specified demographic groups and each of the one or more discrete topics, compute a count value of a number of comments in the survey response data associated with each of the one or more specified demographic groups and relevant to each of the one or more discrete topics, and based upon document weights computed for each topic word in an associated combination of topic words that exceed a threshold value, and
generate a report for each of the one or more specified demographic groups, the report comprising an indication of a relative importance of each of the one or more discrete topics based upon the count value of the number of comments in the survey response data computed for each of the one or more specified demographic groups and each of the one or more discrete topics.

15. The system of claim 14, wherein identifying the plurality of topic words from the text of the comments and computing the weight regarding each of the plurality of topic words further comprises:
extracting a plurality of terms from the text of the comments;
constructing a term-document matrix, wherein each entry in the term-document matrix comprises a frequency of occurrence of one of the plurality of term in the text of one of the comments;
transforming the term-document matrix utilizing a matrix decomposition into a transformed matrix, wherein each entry in the transformed matrix comprises a weight for one of the plurality of terms in one of the comments; and
identifying the plurality of topic words from a subset of the plurality of terms each having a weight regarding at least one of the comments exceeding the threshold value.

16. The system of claim 14, further comprises:
identifying at least one group of related topic words from the plurality of topic words based on topic words that represent a same topic, and storing a relationship representing the at least one group of related topic words with corresponding weights for each of the plurality of topic words.

17. The system of claim 14, wherein the report comprises a chart illustrating a relationship between the number of comments of the survey response data computed for each of the one or more specified demographic groups and each of the one or more discrete topics.

18. The system of claim 17, wherein the chart comprises a type of Pareto chart.

* * * * *